United States Patent
Tilley

[11] 3,788,415
[45] Jan. 29, 1974

[54] HYDRAULIC FRONT-WHEEL PROPULSION SYSTEM FOR HARVESTING VEHICLES

[76] Inventor: Henry T. Tilley, P.O. Box 23, Bullock, N.C. 27507

[22] Filed: Feb. 22, 1972

[21] Appl. No.: 233,379

Related U.S. Application Data

[63] Continuation of Ser. No. 3,004, Jan. 15, 1970, abandoned.

[52] U.S. Cl............... 180/26 R, 180/43, 180/66 R, 180/79.2 R, 74/478, 74/512
[51] Int. Cl....................... B62d 61/08, B60k 17/30
[58] Field of Search 180/25, 26 R, 26 A, 43, 79.2 R, 180/79.2 A; 74/478, 512, 520

[56] References Cited
UNITED STATES PATENTS

| | | | |
|---|---|---|---|
| 3,515,234 | 6/1970 | Danford et al.............. | 280/32.5 X |
| 2,695,179 | 11/1954 | Fancsali..................... | 180/26 X |
| 3,290,005 | 12/1966 | Beemsterboer et al...... | 180/66 R X |
| 3,522,861 | 8/1970 | Middlesworth et al...... | 180/66 R X |
| 3,485,315 | 12/1969 | Bergren....................... | 180/66 R |
| 2,865,223 | 12/1958 | Kope............................ | 74/478 X |
| 3,519,097 | 7/1970 | Commons.................... | 180/26 R |

Primary Examiner—Kenneth H. Betts
Assistant Examiner—John P. Silverstrim
Attorney, Agent, or Firm—Anthony A. O'Brien

[57] ABSTRACT

A hydraulic propulsion system utilized to propel and steer the front wheel of a harvesting vehicle under the control of a driver. The hydraulic system includes a manually operable forward-reverse-speed control mechanism, for selectively controlling a hydraulic motor which is operatively connected with the front wheel, as well as a foot-pedal operated steering mechanism whereby the driver can effectively control the propulsion of the vehicle and, at the same time, assist with the harvesting operation.

7 Claims, 6 Drawing Figures

INVENTOR
HENRY T. TILLEY
BY
Anthony H. O'Brien
ATTORNEY

INVENTOR
HENRY T. TILLEY
BY Anthony A. O'Brien
ATTORNEY

INVENTOR
HENRY T. TILLEY

BY Anthony A. O'Brien
ATTORNEY

HYDRAULIC FRONT-WHEEL PROPULSION SYSTEM FOR HARVESTING VEHICLES

This is a continuation of application Ser. No. 3,004 filed Jan. 15, 1970 now abandoned.

BACKGROUND OF THE INVENTION

1. Field of the Invention

The present invention pertains generally to self-propelled harvesting vehicles and more particularly to a unitary hydraulic front-wheel propulsion system for such vehicles.

2. Description of the Prior Art

The continually rising cost of farm labor has stimulated research efforts in the field of mechanized farm machinery as evidenced by recent developments in automated irrigation, cultivation and transplantation systems for various crops, such as tobacco. While most all steps in the production of such crops require a substantial labor investment, the expenditure for harvesting is usually the largest especially for the tobacco farmer since tobacco harvesting is still carried on primarily by hand. Since hand priming of matured tobacco leaves requires large numbers of farm hands during the short tobacco harvesting period, a shortage of labor often develops and combines with the high labor cost to doubly increase the expense of the harvest at a detriment to the farmer as well as the consuming public.

While the above-mentioned problems have long been known, a simple, yet effective mechanized harvesting vehicle for increasing the crop yield per man hour has heretofore been unavailable. While many harvesting vehicles have been developed and have generally served the purpose, they have often proven unsatisfactory under all conditions of operation since they typically require a driver, either for the vehicle itself or for a tractor used to tow the vehicle, who is not able to assist in the harvesting operation while driving, resulting in increased labor costs which may offset a substantial portion of any savings otherwise gained by the farmer from the use of the mechanized vehicle. In addition, many conventional vehicles utilize motive power systems which operate through the rear wheels of the vehicle, are separate from the steering mechanism and are mechanically complex. Such vehicles have also proven disadvantageous under conditions existing when the tobacco field is muddy, for example, since the vehicle often tends to plow into the mud and stall due to the application of driving power to the rear wheels.

SUMMARY OF THE INVENTION

The present invention is summarized in that a self-propelled harvesting vehicle includes a frame, a wheel structure supporting the frame and including a steerable front wheel, a hydraulic motor mechanism connected with the front wheel for rotating the wheel about a horizontal axis, a hydraulic steering mechanism connected with the front wheel for rotating the wheel about a vertical axis, fluid pressure apparatus connected with the hydraulic motor and hydraulic steering mechanism for hydraulically energizing the same, and hydraulic control apparatus connected with the fluid pressure apparatus, the hydraulic motor mechanism and the hydraulic steering mechanism to selectively regulate the energization of the hydraulic motor and steering means whereby the front wheel is selectively actuated to controllably propel and steer the harvesting vehicle.

It is an object of the present invention to construct a self-propelled vehicle having a unitary hydraulic propulsion system.

The present invention has an additional object in that a three-wheeled vehicle includes hydraulic front wheel propulsion and steering apparatus.

Another object of this invention is to construct a hydraulic propulsion system capable of both propelling and steering a harvesting vehicle at a front wheel thereof.

The present invention has a further object in that a harvesting vehicle has hydraulic driving and steering controls operable by means of foot pedals.

The present invention is advantageous over the prior art in that a harvesting apparatus is self-propelled at a front wheel, includes a unitary hydraulic propulsion system, and provides foot pedal steering control enabling the vehicle driver to assist in the harvesting operation.

Further objects and advantages of the present invention will become more fully apparent from the following description of the preferred embodiment when taken in conjunction with the accompanying drawing.

DESCRIPTION OF THE PREFERRED EMBODIMENT

Figure 1:
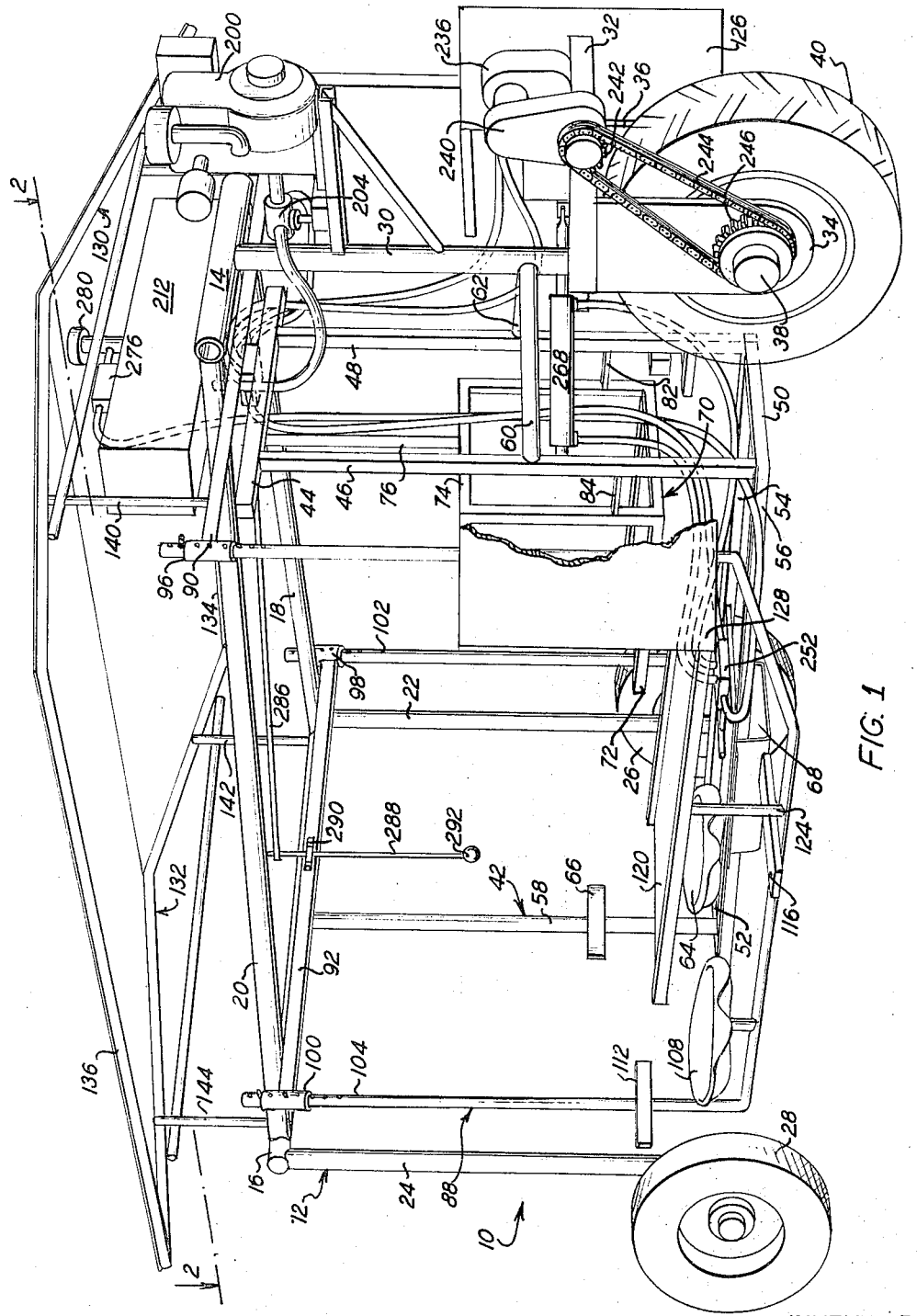
FIG. 1 is a perspective view of a harvesting vehicle embodying a hydraulic propulsion system constructed in accordance with the present invention.

Referring to FIGS. 1 through 4, the hydraulic propulsion and steering system of the present invention is embodied in a three-wheeled harvesting vehicle, indicated generally at 10, having a frame 12 composed of forward and rear upper transverse frame members 14 and 16 connected together at their opposite ends by a pair of longitudinally oriented frame members 18 and 20. Extending downwardly from the rear transverse frame member 16 is a pair of vertically oriented wheel carrying frame members 22 and 24 having their upper ends rigidly attached to the transverse frame member 16 by any suitable means, such as by welding, and having their lower ends fixedly attached to a pair of rear wheel assemblies 26 and 28, respectively. Extending downwardly from the mid-point of the forward transverse frame member 14 is a vertically disposed frame member 30 which is rigidly attached at its upper end to the transverse member 14 and pivotally carries a horizontal motor mounting plate 32 at its lower end. Horizontal plate 32 is adapted to rotate about a vertical axis which is concentric with the vertically disposed frame member 30 and includes a pair of downwardly directed vertical wheel supporting plates 34 and 36 rigidly mounted at their upper ends to opposite sides of the horizontal mounting plate 32 to form an inverted, generally U-shaped structure adapted to horizontally support a wheel mounting axle 38 therebetween upon which is carried a front drive wheel assembly 40.

Frame 12 of the vehicle 10 includes a centrally disposed frame sub-assembly 42 having a forward upper transverse support member 44 rigidly mounted upon and extending between the undersurface of longitudinal frame members 18 and 20 and spaced from forward transverse frame member 14. A pair of vertically oriented support members 46 and 48 are horizontally spaced from each other and are attached at their upper ends to the transverse support member 44 at the undersurface thereof. The lower ends of support members 46 and 48 are fixedly connected to respective forward corners of a generally rectangular horizontal support structure having forward and rear transverse sections 50 and 52, respectively, joined at their respective opposite ends by longitudinal sections 54 and 56. A vertically disposed frame member 58 is rigidly mounted at its upper end to the mid-point of the rear transverse frame member 16 and at its lower end to the mid-point of the rear section 52 of the horizontally aligned lower support structure of the centrally disposed frame sub-assembly 42. It is noted that a pair of horizontally aligned converging support members 60 and 62 may be mounted from the mid-points of vertical support members 46 and 48, respectively, to the lower portion of the forward vertical wheel supporting frame member 30 so as to provide additional structural stabilization for the assembly 42.

Frame assembly 42 additionally carries a driver's seat, which may be of any suitable type and may include a lower seat portion 64 which is rigidly mounted upon the rear upper surface of the lower horizontally aligned rectangular supporting structure between longitudinal support members 54 and 56 and a transversely oriented back support member 66 located upon the lower front side of vertical frame member 58. A generally U-shaped tray 68 extends transversely between adjacent intermediate sections of longitudinal support members 54 and 56 so as to provide a foot rest for the driver and facilitate easy entrance and exit from the vehicle.

A generally L-shaped rack or tray 70 is centrally mounted for receiving the crops, such as tobacco leaves, harvested by the driver of the vehicle and includes a flat horizontal shelf member 72 mounted along its front edge to the lower end of a vertically disposed rectangular frame 74 which is suspended at the mid-point of its upper edge by a horizontal supporting pipe 76 which is rigidly mounted at its lower end to the rectangular frame 74 and is adjustably mounted within a sleeve 78. The sleeve 78 is firmly attached as by welding to a longitudinally oriented upper support beam 80 which is cantilever mounted upon the upper surface of transverse support member 44 at the approximate mid-point thereof. A pair of flat horizontal spacing members 82 and 84 are attached to the rear surface of vertical supporting members 46 and 48 to maintain the vertical alignment of the rectangular section 74 of rack 70.

A second frame sub-assembly, indicated generally at 88, includes a forward transverse member 90 and a rear transverse member 92, each having a pair of vertically aligned sleeves 94 and 96, and 98 and 100, respectively, rigidly mounted at their opposite ends. A pair of generally U-shaped frame members 102 and 104 are adapted to be mounted at their upper extremities within sleeves 94 and 98, and 96 and 100, respectively, for supportably carrying additional farmhands so as to facilitate the harvesting of more than a single row of crops at any particular time. Each of the upper ends of U-shaped frame members 102 and 104 contain a plurality of aligned holes for receiving a removable pin to permit adjustment of the height of the frame member with respect to the ground. Mounted upon each of the identical U-shaped support members 102 and 104 are respective seats 106 and 108, horizontally aligned back supporting braces 110 and 112, horizontal foot supporting members 114 and 116, and crop receiving racks 118 and 120. Each of the racks 118 and 120 is supported at its approximate mid-point by vertical support braces 122 and 124. A pair of shield members 126 and 128 may be mounted upon the front vertical portion of U-shaped structures 102 and 104 so as to protect the harvested crop in the racks 118 and 120. It is noted that an additional shield structure (not shown) may be included in front of the forward wheel assembly 40 so as to protect the drive mechanism to be described below.

The harvesting vehicle 10 may include an upper cover, if desired, formed by generally triangular forward and rear transverse frame structures 130 and 132 respectively joined at their opposite ends by a pair of longitudinally disposed framing elements 134 and 136. The cover or roof structure is mounted atop the vehicle 10 by a pair of forward vertical legs 138 and 140 extending from the forward triangular frame structure 130 to opposite ends of transverse member 90 of frame sub-assembly 88, and a pair of rear vertical legs 142 and 144 extending from the rear triangular framing structure 132 to the rear portion of longitudinal frame members 18 and 20. A protective material, such as canvas or light-weight fiberglass sheeting is supportably carried upon the upper surface of the framing structure formed by forward and rear triangular framing structures 130 and 132 and longitudinal frame elements 134 and 136 so as to provide a generally peaked protective roof assembly for the harvesting vehicle 10.

The harvesting vehicle described above is thus adapted to carry a driver and two additional operators through a tobacco field with rear wheels 26 and 28 riding in the outer furrows of a pair of adjacent rows of tobacco plants and the single steerable front wheel assembly 40 riding in the middle furrow. It should be understood, of course, that additional frame sub-assemblies may be added if desired so that additional operators can be carried upon the harvesting vehicle 10.

Figure 5:
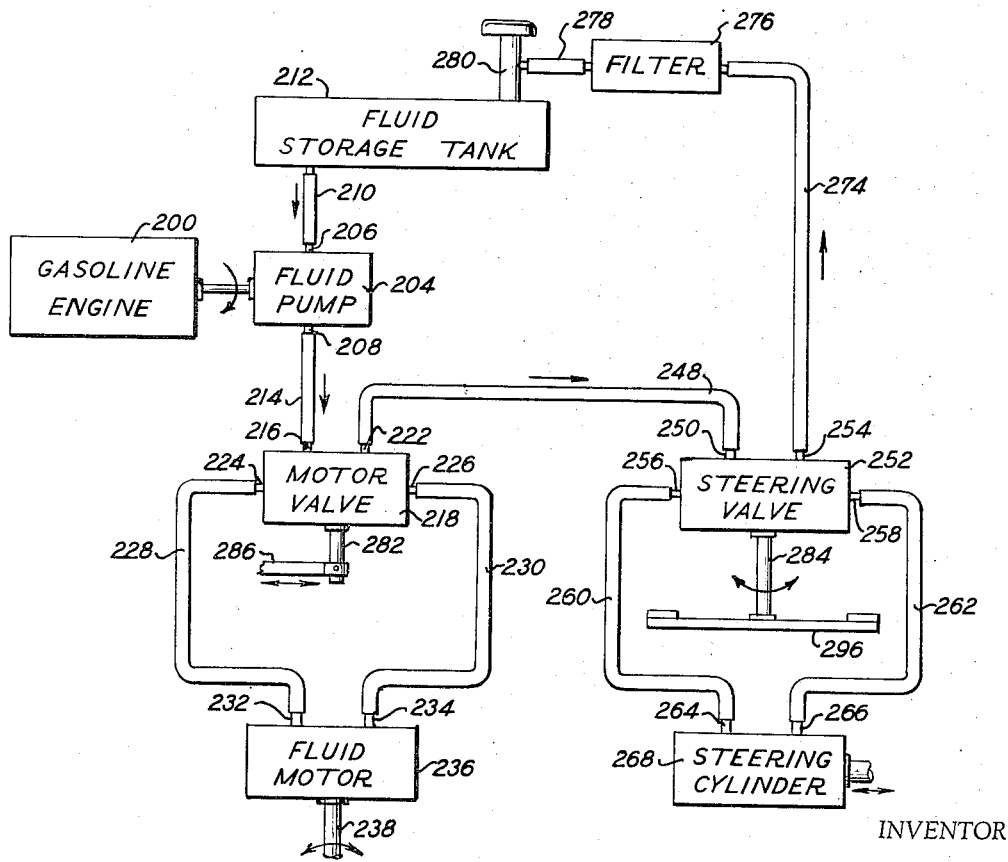
FIG. 5 is a schematic diagram illustrating the hydraulic circuit of the system of FIG. 1.
Figure 6:
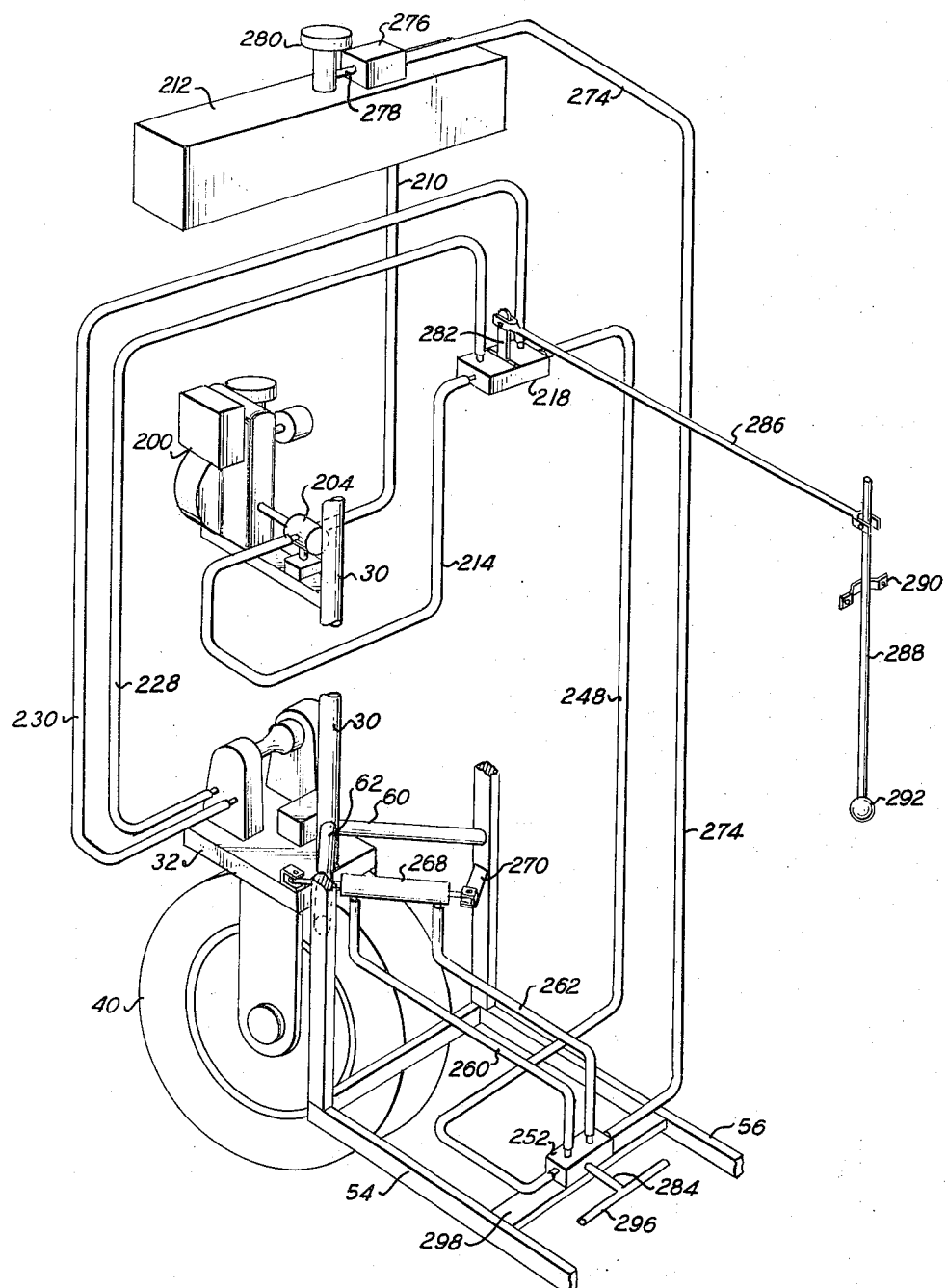
FIG. 6 is a diagrammatic perspective view of the hydraulic circuit of FIG. 5 illustrating the general relationship of the hydraulic system with respect to the harvesting vehicle of FIG. 1.

The hydraulic propulsion and steering system of the present invention is shown schematically in FIG. 5, and the spatial relationship between the component parts of the hydraulic system and the harvesting vehicle is diagramatically illustrated in FIG. 6. The hydraulic system includes a rotary engine of any suitable type such as an air-cooled gasoline engine 200 mounted on a support member 202 which is carried upon the upper front surface of vertical frame member 30 (FIG. 1). The gasoline engine 200 has its output shaft operatively connected to a fluid pump 204 having inlet and outlet ports 206 and 208, respectively. Inlet port 206 of the fluid pump 204 is connected by a hydraulic fluid suction line 210 to an outlet orifice of a generally rectangular fluid storage tank 212 which is mounted atop the harvesting vehicle in transverse relationship across main frame members 18 and 20. The outlet port 208 of the fluid pump 204 is connected by a hydraulic pressure line 214 to an inlet port 216 of a hydraulic motor control valve 218 which is mounted upon a flat cantilevered plate 220 (FIG. 3) rigidly attached to the upper surface of transverse frame member 44.

The motor valve 218 includes a main outlet port 222 and a pair of controlled outlet ports 224 and 226 which are respectively connected via hydraulic lines 228 and 230 to the connecting ports 232 and 234 of a hydraulic fluid motor 236. As shown in FIG. 1, and diagramatically in FIG. 6, the fluid motor 236 is mounted upon the upper surface of horizontal plate 32 and has its output shaft 238 drivingly coupled to front wheel assembly 40 by a suitable gearing arrangement 240. Power from motor 236 is applied through a sprocket 242 mounted upon an output shaft of the gearing assembly 240, a chain 244, and a second sprocket wheel 246 suitably attached to the front wheel assembly 40 so as to produce rotation of the front wheel about its horizontally aligned axle 38.

Figure 2:
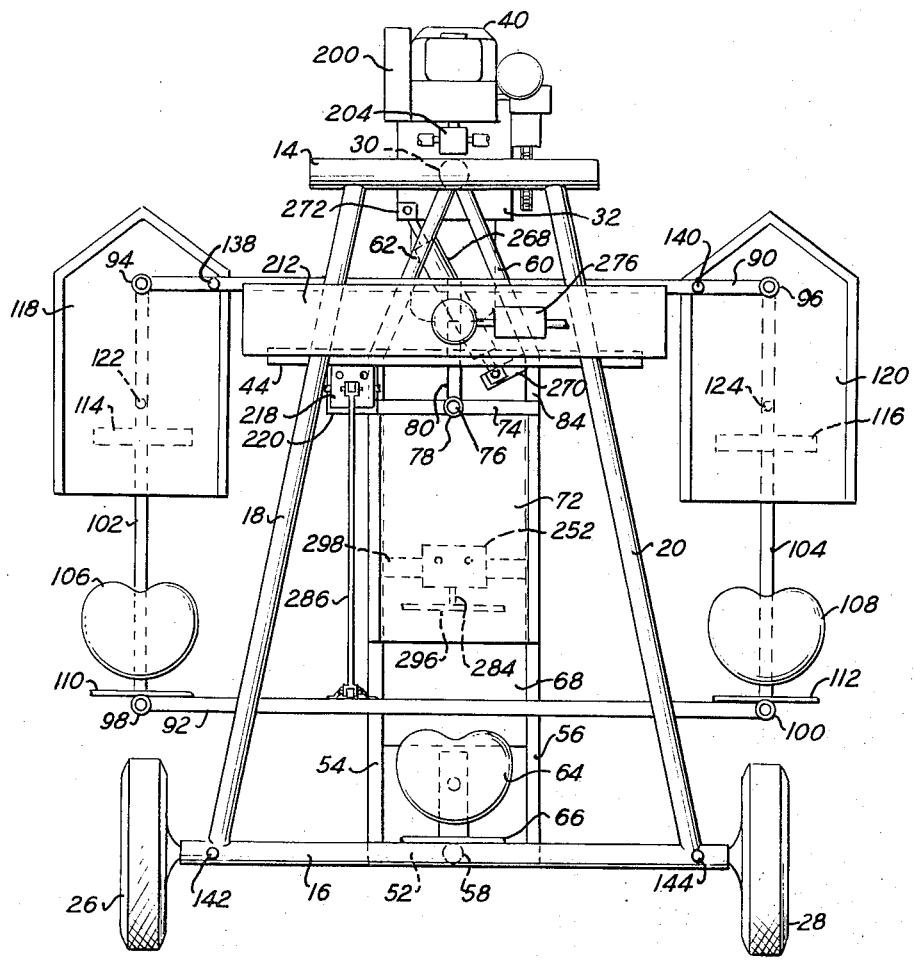
FIG. 2 is a plan view taken along line 2—2 of FIG. 1.

The main outlet port 222 of the motor valve 218 is connected by a hydraulic line 248 to inlet port 250 of a hydraulic steering valve 252. The steering valve 252 includes a main outlet port 254 and a pair of controlled outlet ports 256 and 258 which are respectively connected by hydraulic lines 260 and 262 to the connecting ports 264 and 266 of a hydraulic steering cylinder 268. As seen in FIGS. 1 and 2, the hydraulic steering cylinder 268 has one end pivotally mounted to an angularly disposed flat mounting bar 270 which is rigidly attached to the vertical frame member 46, with the opposite end pivotally mounted to a rear corner of horizontal wheel supporting plate 32 by a hinged connector 272 so as to control the angular position of front wheel assembly 40 about its vertical axis of rotation in accordance with axial expansion and contraction of the steering cylinder.

Outlet port 254 of the steering valve 252 is returned to the fluid storage tank 212 by a hydraulic line 274 which is connected at one end to port 254 and at its other end to a fluid filter 267 which has its outlet connected by a hydraulic line 278 to an inlet filler pipe 280 of the storage tank 212. As seen in FIG. 5, the hydraulic system thus has a main pressurized fluid flow path which serially runs from outlet port 208 of hydraulic fluid pump 204 through pressure line 214, inlet and outlet ports 216 and 222 of hydraulic motor valve 218, hydraulic line 248, inlet and outlet ports 250 and 254 of steering valve 252, and thence through hydraulic line 274, fluid filter 276, fluid storage tank 212 and hydraulic suction line 210 to the fluid pump 204. As will become clear below, the main pressurized fluid flow path forms a complete closed hydraulic circuit for providing pressurized fluid to both motor valve 218 and steering valve 252 regardless of their operative state. In other words, motor valve 218 receives pressurized fluid via hydraulic line 214 at all times when pump 204 is energized regardless of whether steering valve 252 is being operated or not, and similarly, steering valve 252 receives pressurized fluid via line 214, main inlet and outlet ports 216 and 222, respectively, of valve 218, and line 248 independently of the operative condition of the motor valve 218.

Hydraulic motor valve 218 and steering valve 252 are of similar construction and respectively include control shafts 282 and 284. Referring to FIGS. 1 and 2, the control shaft 282 of motor valve 218 is pivotally connected to a longitudinally oriented linkage bar 286 which is similarly pivotally mounted at its opposite end to the upper end of a vertically disposed linkage member 288. Member 288 is adapted to be pivoted about a hinge member 290 mounted upon the front side of transverse frame member 92. Hinge member 290 acts as a fulcrum so as to enable the driver of the harvesting vehicle to selectively displace the valve control shaft 282 by linearly moving the lower end of vertical linkage member 288 upon which is mounted a hand-grip ball 292.

Figure 4:
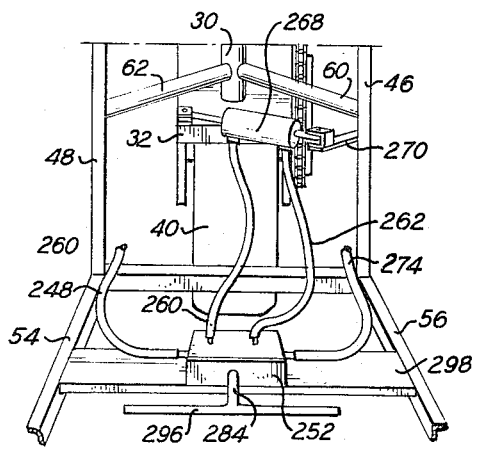
FIG. 4 is a sectional perspective view of another detail of the hydraulic propulsion system of FIG. 1.
Figure 3:
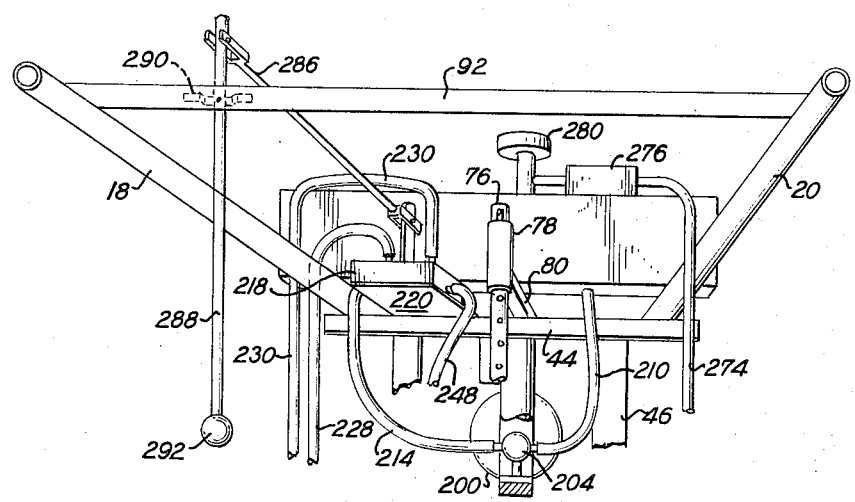
FIG. 3 is a sectional perspective view illustrating a detail of the hydraulic propulsion system of FIG. 1.

Referring to FIGS. 2, 4 and 6, a foot-pedal steering bar 296 is perpendicularly mounted at its mid-point to the end of control shaft 284 of the steering valve 252, and the hydraulic steering valve 252 is mounted on the upper surface of a transverse frame member 298 which is rigidly attached between frame members 54 and 56 of the frame sub-assembly 42. The steering valve 252 is aligned such that steering bar 296 and steering control shaft 284 lie in a horizontal plane; in this manner, the driver of the harvesting vehicle may readily control the position of control shaft 284 of hydraulic steering valve 252 by placing his feet against the opposite ends of foot-pedal 296 and selectively rocking the assembly to either the left or right (as visualized in FIG. 2) for steering the vehicle, as will be more fully explained below.

In operation, as control shaft 282 of motor valve 218 is moved to the left, as visualized in FIG. 5, a flow of pressurized hydraulic fluid form hydraulic fluid from hydraulic line 214 is established through controlled outlet port 224 and line 228 to the fluid motor connecting port 232 for causing rotation of the motor output shaft 238 in a clockwise direction. As the shaft 282 is moved further to the left, an increased flow is established to increase the speed of the motor output shaft 238. A fluid return path for the motor is provided through connecting port 234 and line 230 back to the motor valve 218 and thence through outlet port 222 thereof to hydraulic line 248. In a similar manner, as the control shaft 282 of valve 218 is moved to the right, the pressurized hydraulic fluid from line 214 is fed through controlled outlet port 226 and line 230 to connecting port 234 of the fluid motor 236 for establishing a counterclockwise rotation of output shaft 238, the speed of which is dependent upon the degree of movement of control shaft 282 toward the right. During the counterclockwise rotation of motor shaft 238, fluid line 228 acts as the return path for hydraulic fluid which is fed via the motor valve 218 to outlet port 222 and thence to hydraulic line 248. Thus, as the control shaft 282 is selectively moved to the left and to the right, a flow of hydraulic fluid is established through the fluid motor 236 in either of two directions, so as to produce either a clockwise or a counterclockwise rotation of output shaft 238 for driving the harvesting vehicle in either forward or reverse directions and for regulating the speed thereof.

Steering valve 252 operates in a similar manner to that of motor valve 218 and functions to regulate the angular position of front wheel assembly 40 about its vertical axis. In other words, as shaft 284 of valve 252 is moved to the left, as visualized in the schematic diagram of FIG. 5, a flow of pressurized hyraulic fluid from hydraulic line 248 is established through the valve to controlled outlet port 256 and thence via line 260 to the steering cylinder connecting port 264 for producing axial expansion of the steering cylinder 268 so as to rotate wheel assembly 40 to the right as viewed in FIG. 2. The hydraulic fluid flowing through the steering cylinder is returned to the fluid storage tank 212 by a fluid return path provided through connecting port 266, line 262, the steering valve 252, valve outlet port 254, and line 274 to fluid filter 276. Similarly, as the control shaft 284 of the steering valve 252 is moved to the right, the pressurized hydraulic fluid from line 248 is fed through controlled outlet port 258 and hydraulic line 262 to hydraulic connecting port 266 of the steering cylinder so as to produce axial contraction of the steering cylinder resulting in rotation of the wheel assembly 40 to the left as seen in FIG. 2. During the time when control shaft 284 is moved to the right a return path is provided for the hydraulic fluid flowing through steering cylinder 268 by connecting port 264 and line 260, valve 252 from controlled outlet port 256 to main outlet port 254, and hydraulic line 274 to fluid filter 276. Thus, as the controlled shaft of the steering valve 252 is selectively moved to the left and to the right, hydraulic fluid is applied either to port 264 or port 266 of the hydraulic steering cylinder 268 so as to control the angular position of the steerable front wheel of the hydraulic vehicle 10 about its vertical axis of rotation.

As previously mentioned, the tobacco harvesting vehicle 10 in a preferred embodiment is adapted to carry three operators, one of which functions as the driver of the vehicle as it passes through a tobacco field. As described above, the driver of the vehicle is seated in position upon the frame sub-assembly 42 at seat 64 while the other two operators are seated upon the frame sub-assembly 88 at seats 106 and 108, respectively.

To initially energize the self-propelled harvesting vehicle 10, gasoline engine 200 is started by any suitable means, such as a self-recoiling manually actuated mechanism or a self-contained electric starter, so as to rotate the input shaft of hydraulic fluid pump 204 and pressurize the main fluid circuit of the hydraulic propulsion and steering system. When gasoline engine 200 is running and the main hydraulic circuit has been pressurized, the driver causes the harvesting vehicle 10 to move in a forward direction by grasping hand-grip ball 292 of the motor control linkage and moving it forward so as to actuate the motor control valve shaft 282 and establish a flow of pressurized hydraulic fluid through hydraulic motor 236 in a direction which produces a rotation of the output shaft thereof, and consequently the forward wheel assembly 40, for propelling the harvesting vehicle through the tobacco field. As the driver moves the motor control linkage hand-grip ball 292 forward from its central or neutral position, the amount of hydraulic fluid flowing through the fluid motor 236 is correspondingly increased so that the desired forward speed of the harvesting vehicle can be readily increased by the driver. Similarly, of course, as the hand-grip 292 is brought back toward its central position the amount of fluid flowing through the motor 236 will be reduced and the harvester will slow down. It can thus be seen that the hydraulic propulsion system of the present invention provides self-braking due to the tendency of the hydraulic system to buck or oppose the reverse pressure built up during periods of deceleration.

If at any time the driver desires to propel the vehicle backwards, the motor control linkage is operated to cause movement of the hydraulic motor valve shaft 282 by grasping the linkage hand-grip ball 292 and moving it in a rearward direction from its central or neutral position so as to establish a flow of hydraulic fluid through the fluid motor 236 in a reverse direction. As before, the degree of movement of the motor control linkage to the rear of the vehicle establishes the amount of pressurized fluid flowing through the hydraulic motor 236 and thus determines the speed of the vehicle in the reverse direction.

The steering of the harvesting vehicle is controlled by the driver who by placing his feet upon the steering control bar 296 can selectively actuate hydraulic steering valve 252 by rocking the steering bar 296 to the left and to the right. As explained above, when the steering valve foot-pedal assembly is moved in one direction, a flow of hydraulic fluid is established through the hydraulic steering valve 252 to the steering cylinder 268 causing expansion thereof and accordingly, rotation of the forward wheel assembly 40 about its vertical axis toward the right. Similarly as the steering valve foot control assembly is moved in the opposite direction, the flow of hydraulic fluid through the steering cylinder 268 is reversed so that the steering cylinder contracts, pulling the forward wheel assembly 40 about its vertical axis to the left.

Thus, the unitary hydraulic system of the present invention enables the driver of the harvesting vehicle to easily control the propulsion of the vehicle in either a forward direction or a reverse direction by moving the motor control linkage toward the front or the rear, respectively, and at the same time permits selective regulation of the direction of travel of the vehicle toward the left and toward the right by use of the foot-pedal steering bar 296.

To harvest a field of mature tobacco plants, the self-propelled harvesting vehicle 10 is driven into position in the tobacco filed with the wheels directed in the furrows, and two adjacent tobacco plant rows positioned so as to pass between the two rear wheels of the vehicle on either side of the steerable forward wheel assembly. The driver then moves the motor control linkage forward to the desired position corresponding to the desired rate of travel of the harvesting vehicle through the field. The alignment of the harvester with respect to the tobacco plant rows is assured by the foot-controlled operation of the hydraulic steering valve 252 by the vehicle driver. As the harvesting vehicle 10 passes through the field, each of the operators as well as the driver, whose hands are freed for harvesting by the provision of foot-controlled steering, can selectively defoliate the matured tobacco plants, placing the harvested tobacco leaves in an orderly pile atop their respective tobacco racks. If, according to the preferred mode of operation, each of the operators and the driver prime the tobacco plants in the tobacco plant rows to their left as the harvesting vehicle 10 is propelled through the tobacco field, three adjacent plant rows can be harvested during any one pass of the vehicle through the field. Of course, the three operators may choose to prime the tobacco plant rows on their right as they travel through the field with the same result, the only required condition of operation being that all three operators must perform the priming operation upon the tobacco rows which run along the same side of their respective operating stations.

From the above description, it can be seen that the harvesting vehicle 10 is provided with a unitary hydraulic propulsion and steering system which is operatively connected with a single front wheel and permits foot-controlled steering so that the driver's hands are freed allowing him to assist in the priming operation while driving. Since the motive power of the hydraulic vehicle 10 of the present invention is applied through the front wheel, the vehicle operates effectively under any of various conditions which may exist in the field. When the field is muddy, for example, the front-wheel drive tends to pull the vehicle out of the mud and through the field as opposed to the plowing or stalling type of operation frequently experienced with rear-wheel drive vehicles. In addition, since both the propulsion and steering functions for the harvesting vehicle 10 are provided by a single hydraulic system applied through the front wheel thereof, the propulsion mechanism is considerably simpler than that heretofore available, resulting in a substantial reduction in both initial construction costs and expected maintenance outlays. This, of course, reduces the probability of a mechanical breakdown of the vehicle which thus assures complete harvesting of the tobacco crop at maturity.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. A self-propelled harvesting vehicle comprising,
a frame,
wheel means supporting said frame and including a steerable front wheel,
hydraulic motor means connected with said front wheel for rotating said wheel about a horizontal axis,
hydraulic steering means connected with said front wheel for rotating said wheel about a vertical axis,
fluid pressure means connected with said hydraulic motor and hydraulic steering means for hydraulically energizing the same,
hydraulic control means connected with said fluid pressure means, said hydraulic motor means and said hydraulic steering means to selectively regulate the energization of said hydraulic motor and steering means whereby said front wheel is selectively actuated to controllably propel and steer the harvesting vehicle,
said hydraulic control means including first valve means connected with said fluid pressure means and said hydraulic motor means, and second valve means connected with said fluid pressure means and said hydraulic steering means,
said second valve means including foot-pedal means to control said hydraulic steering means for steering the vehicle, and
said first valve means includes a first hydraulic valve having a pressure fluid inlet connected to said fluid pressure means, a pressure fluid outlet connected to said second valve means, and first and second controlled fluid outlets connected to said hydraulic motor means.

2. The invention as recited in claim 1 wherein said first valve means includes mechanical linkage means connected with said first hydraulic valve to enable manual control of said first hydraulic valve whereby the horizontal rotation of said front wheel can be manually controlled.

3. The invention as recited in claim 1 wherein said second valve means includes a second hydraulic valve having a pressure fluid inlet connected to said pressure fluid outlet of said first hydraulic valve, a pressure fluid outlet connected to said fluid pressure means, and first and second controlled fluid outlets connected to said hydraulic steering means.

4. A self-propelled harvesting vehicle comprising,
a frame,
wheel means supporting said frame and including a steerable front wheel,
hydraulic motor means connected with said front wheel for rotating said wheel about a horizontal axis,
hydraulic steering means connected with said front wheel for rotating said wheel about a vertical axis,
fluid pressure means connected with said hydraulic motor and hydraulic steering means for hydraulically energizing the same,
hydraulic control means connected with said fluid pressure means, said hydraulic motor means and said hydraulic steering means to selectively regulate the energization of said hydraulic motor and steering means whereby said front wheel is selectively actuated to controllably propel and steer the harvesting vehicle,
said hydraulic control means including first and second hydraulic valves, each having a pressure fluid inlet and outlet and each having first and second controlled fluid outlets,
the pressure fluid inlet of said first hydraulic valve and the pressure fluid outlet of second hydraulic valve being connected to said fluid pressure means,
the pressure fluid outlet of said first hydraulic valve being connected to the pressure fluid inlet of said second hydraulic valve,
the first and second controlled fluid outlets of said first hydraulic valve being connected to said hydraulic motor means,
the first and second controlled fluid outlets of said second hydraulic valve being connected to said hydraulic steering means, and
foot-pedal means connected with said second hydraulic valve to enable foot control of said hydraulic valve whereby the vertical rotation of said front wheel may be controlled thereby to steer the harvesting vehicle.

5. In a steerable vehicle, a hydraulic propulsion and steering system comprising
hydraulic propulsion means operatively connected with a steerable front wheel of the vehicle and including a hydraulic motor for selectively imparting rotary motion to said steerable front wheel to propel the vehicle in forward and reverse directions,
said hydraulic motor having an output shaft and first and second fluid connecting ports permitting a fluid flow through said motot in either of first and second directions for causing rotation of said shaft in either of clockwise and counterclockwise direction,
hydraulic steering means operatively connected with said steerable front wheel of the vehicle and including a hydraulic cylinder for selectively controlling the angular position of said steerable front wheel about a vertical axis, said hydraulic cylinder having an operator mechanism and first and second fluid connecting ports permitting a fluid flow therethrough in either of first and second directions for causing axial expansion and contraction, respectively, of said operator mechanism, fluid pressure means having a hydraulic pump and a reservoir and being serially connected with said hydraulic propulsion means and said hydraulic steering means for hydraulically energizing both said hydraulic propulsion means and said hydraulic steering means whereby said steerable front wheel is hydraulically rotated about horizontal and vertical axes for controllably driving the vehicle, said fluid pressure means including a manually operable motor valve having an inlet port connected with said hydraulic pump, an outlet port connected with said reservoir, and first and second controlled ports respectively connected with said first and second fluid connecting ports of said hydraulic motor whereby said hydraulic motor may be manually controlled, and said fluid pressure means including a pedal operated steering valve having an inlet port connected to said outlet port of said motor valve, an outlet port connected with said reservoir, and first and second controlled ports respectively connected with said first and second fluid connecting ports of said hydraulic cylinder.

6. The invention as recited in claim 5 wherein said motor valve and said steering valve each include control means selectively establishing fluid flow from said first controlled port to said second controlled port and from said second controlled port to said first controlled port whereby the rotational direction of said hydraulic motor and the expansion and contraction of said operator mechanism may be selectively regulated.

7. In a three-wheeled harvesting vehicle, a hydraulic propulsion and steering system comprising fluid pressure means including a pump and a fluid reservoir, hydraulic propulsion means operatively connected with one of the wheels of the vehicle for imparting rotary motion thereto about a horizontal axis for propelling the vehicle, propulsion control means connecting said fluid pressure means with said hydraulic propulsion means for selectively controlling the propulsion of the vehicle by said hydraulic propulsion means, hydraulic steering means operatively connected with said one of the wheels of the vehicle for imparting rotary motion thereto about a vertical axis to enable steering of the vehicle, steering control means connecting said fluid pressure means with said hydraulic steering means for enabling selective controlling of the steering of the vehicle, said propulsion control means and said steering control means being serially connected with said fluid pressure means to form a single closed hydraulic system whereby the vehicle is both hydraulically propelled and hydraulically steered, said propulsion control means comprising a hydraulic propulsion valve having an inlet, an outlet, a plurality of controlled outlets, and a manual operator mechanism, and said steering control means comprising a hydraulic steering valve having an inlet connected with said outlet of said hydraulic propulsion valve, an outlet, a plurality of controlled outlets, and a foot pedal operator mechanism.

* * * * *